US007805515B2

(12) United States Patent
Riley

(10) Patent No.: US 7,805,515 B2
(45) Date of Patent: Sep. 28, 2010

(54) METHOD FOR DYNAMIC RATE ADAPTATION BASED ON SELECTIVE PASSIVE NETWORK MONITORING

(75) Inventor: Yusun Kim Riley, Marlborough, MA (US)

(73) Assignee: Camiant, Inc., Marlborough, MA (US)

( * ) Notice: Subject to any disclaimer, the term of this patent is extended or adjusted under 35 U.S.C. 154(b) by 1191 days.

(21) Appl. No.: 11/230,325

(22) Filed: Sep. 19, 2005

(65) Prior Publication Data

US 2006/0062209 A1 Mar. 23, 2006

Related U.S. Application Data

(60) Provisional application No. 60/611,563, filed on Sep. 20, 2004.

(51) Int. Cl.
*G06F 15/173* (2006.01)
(52) U.S. Cl. .................. 709/226; 709/227; 709/228; 709/229; 370/232
(58) Field of Classification Search .............. 709/226, 709/227, 228, 229
See application file for complete search history.

(56) References Cited

U.S. PATENT DOCUMENTS

| 6,067,545 | A | 5/2000 | Wolff | |
|---|---|---|---|---|
| 6,330,602 | B1 | 12/2001 | Law et al. | |
| 6,578,077 | B1* | 6/2003 | Rakoshitz et al. | 709/224 |
| 6,738,390 | B1 | 5/2004 | Xu et al. | |
| 6,771,639 | B1 | 8/2004 | Holden | |
| 7,009,939 | B2* | 3/2006 | Baker et al. | 370/252 |
| 7,543,052 | B1* | 6/2009 | Cesa Klein | 709/224 |
| 2002/0188732 | A1 | 12/2002 | Buckman et al. | |
| 2003/0145075 | A1* | 7/2003 | Weaver et al. | 709/223 |

(Continued)

FOREIGN PATENT DOCUMENTS

GB  2313250  11/1997

(Continued)

OTHER PUBLICATIONS

"Cable Modem Termination System-Network Side Interface Specification," SP-CMTS-NSII01-960702, I01, Jul. 2, 1996.

(Continued)

*Primary Examiner*—Joon H Hwang
*Assistant Examiner*—Jasmine Myers
(74) *Attorney, Agent, or Firm*—Jenkins, Wilson, Taylor & Hunt, P.A.

(57) ABSTRACT

A method for managing a session over a network that involves multiple end points obtaining services via an application server, the method involving: after the end points have registered with the application server for the session, establishing initial policies for network traffic flows for each end point participating in the session; after establishing the initial policies, determining information about the network traffic flows for at least some of the multiple end points participating in the session; from the information determined about the network traffic flows, identifying which of the multiple end points is functioning as a host server for the session; and after identifying which of the multiple end points is functioning as the host server, establishing new policies for network traffic flows for the multiple end points, wherein under the new policies fewer network resources are reserved for each of the multiple end points other than and as compared to the end point functioning as the host server.

18 Claims, 2 Drawing Sheets

U.S. PATENT DOCUMENTS

| | | | |
|---|---|---|---|
| 2003/0208609 A1 | 11/2003 | Brusca | |
| 2003/0229692 A1 | 12/2003 | Vo | |
| 2004/0001536 A1* | 1/2004 | Lohtia et al. | 375/225 |
| 2004/0044762 A1 | 3/2004 | Peacock | |
| 2004/0083267 A1 | 4/2004 | Thompson | |
| 2004/0111508 A1 | 6/2004 | Dias et al. | |
| 2004/0225687 A1 | 11/2004 | Larsson et al. | |
| 2005/0289618 A1* | 12/2005 | Hardin | 725/95 |

FOREIGN PATENT DOCUMENTS

| | | |
|---|---|---|
| WO | WO-03024034 | 3/2003 |
| WO | WO-2004006520 | 1/2004 |

OTHER PUBLICATIONS

Data Over Cable System Interface Specification Quality of Service Management Information Base (DOCSIS-QOS MIB), Feb. 2005.

"PacketCable 1.2 Architecture Framework Technical Report," PKT-TR-ARCH1.2-V01-001229, V01, Dec. 29, 2000.

"PacketCable Dynamic Quality-of-Service-Specification," PKT-SP-DQOS-I09-040402, I09, Apr. 2, 2004.

"PacketCable Multimedia Architecture Framework Technical Report," PKT-TR-MM-ARCH-V01-030627, V01, Jun. 27, 2003.

"PacketCable Multimedia Specifcation," PKT-SP-MM-I01-030627, I01, Jun. 27, 2003.

"SDP: Session Description Protocol," RFC 2327, Apr. 1998.

"SIP: Session Initiation Protocol," RFC 3261, Jun. 2002.

"Specification of Guaranteed Quality of Service," RFC 2212, Sep. 1997.

"Specification of the Controlled-Load Network Element Service," RFC 2211, Sep. 1997.

U.S. Appl. No. 10/867,157, filed Jun. 14, 2004, Riley et al.

U.S. Appl. No. 10/867,158, filed Jun. 14, 2004, Riley et al.

U.S. Appl. No. 10/867,159, filed Jun. 14, 2004, Riley et al.

U.S. Appl. No. 11/041,779, filed Jan. 24, 2005, Riley.

U.S. Appl. No. 11/041,918, filed Jan. 24, 2005, Riley et al.

"The Use of RSVP with IETF Integrated Services," RFC 2210, Sep. 1991.

PCT, International Search Report, dated Nov. 5, 2007.

Huljenic, D. et al., "Networked Virtual Environments—Analysis of end-to-end QoS for networked virtual reality services in UMTS" IEEE Communications Magazine, IEEE Service Center, Piscataway, US, vol. 42(4): 49-55 (Apr. 1, 2004).

European Search Report issued for European Application No. 05797862, dated Jun. 3, 2009.

* cited by examiner

METHOD FOR DYNAMIC RATE ADAPTATION BASED ON SELECTIVE PASSIVE NETWORK MONITORING

This application claims the benefit of U.S. Provisional Application No. 60/611,563, filed Sep. 20, 2004, incorporated herein by reference.

TECHNICAL FIELD

This invention relates to methods implemented by policy servers on a network such as a cable, DSL, FTTx, xPON, 3G (wireless) networks.

BACKGROUND OF THE INVENTION

Currently allocation of resources in networks such as cable networks is typically done on a best efforts basis, i.e., the subscribers compete with all other devices on an equal basis. The systems do not commit resources to end-points, rather all end-points compete to get a share of the same resources. So, subscribers end up using whatever they get. In many existing systems, the applications have been designed or modified on the assumption that the best efforts approach will be used, i.e., they have been designed or modified to account for known shortcomings of the best efforts approach. Thus, if there are three end-points (A, B, and C) that will be participating in a session after each has obtained whatever resources it is able to obtain on the best efforts basis, they will negotiate to determine which has the best upstream/downstream bandwidth. The one that has the best upstream/downstream bandwidth is identified as the host for the session. If the resources are not available under the best efforts approach, then the performance of the application suffers.

SUMMARY OF THE INVENTION

In general, in one aspect, the invention features a method for managing a session over a network that involves multiple end points obtaining services via an application server. The method involves: after the end points have registered with the application server for the session, establishing initial policies for network traffic flows for each end point participating in the session; after establishing the initial policies, determining information about the network traffic flows for at least some of the multiple end points participating in the session; from the information determined about the network traffic flows, identifying which of the multiple end points is functioning as a host server for the session; and after identifying which of the multiple end points is functioning as the host server, establishing new policies for network traffic flows for the multiple end points, wherein under the new policies fewer network resources are reserved for each of the multiple end points other than and as compared to the end point functioning as the host server.

Other embodiments include one or more of the following features. Determining information about the network traffic flows for at least some of the multiple end points participating in the session involves determining the network traffic flows for each of the multiple end points participating in the session. Determining the network traffic flows involves monitoring the network traffic flows. Determining the network traffic flows involves receiving notifications from one or more other entities on the network about the network traffic flows. The initial policies specify the amount of network bandwidth reserved for each end point. Under the initial policies the same amount of network bandwidth is reserved for each of the multiple end points. The network bandwidth that is reserved for each end point exceeds an expected bandwidth required for the host server. Establishing new policies for network traffic flows for the multiple end points involves reducing the amount of bandwidth that is reserved for each of the multiple end points other that the one functioning as the host server. The network is one of a cable network, a DSL network, an FTTx network, an xPON network and a data-over-wireless network.

The details of one or more embodiments of the invention are set forth in the accompanying drawings and the description below. Other features, objects, and advantages of the invention will be apparent from the description and drawings, and from the claims.

DETAILED DESCRIPTION

The described embodiment is a multi-point network in which end-points participate in sessions for which session requirements cannot be determined prior to the beginning of the session. The network includes a policy server that dynamically adapts the allocation of network resources based upon selective passive monitoring of the use of network resources by the end-points that are participating in the session. The described embodiment ensures a more optimal utilization of the network especially in a situation where the session requirements cannot be accurately determined prior to the beginning of the session.

Figure 1:
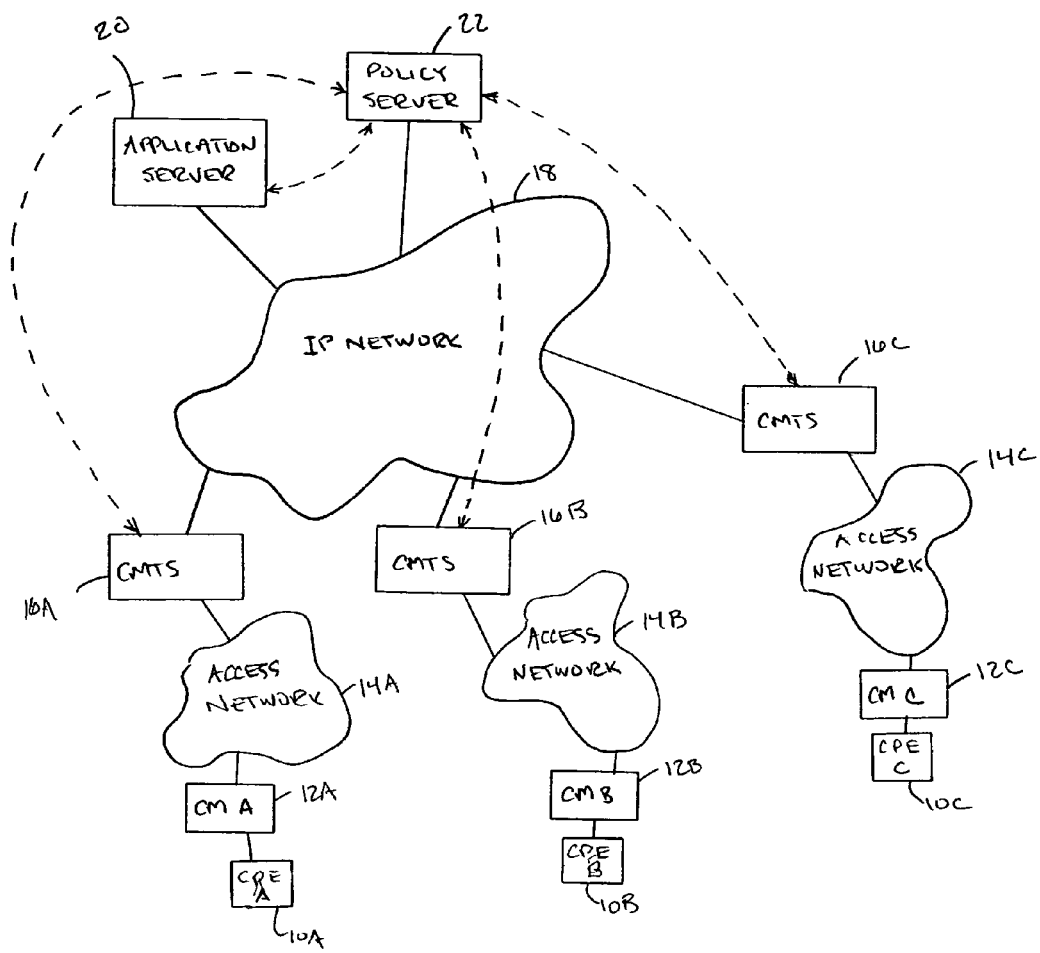
FIG. 1 is a block diagram of a cable network that implements the invention.

As shown in FIG. 1, the network of the described embodiment is a cable network that includes Customer Premises Equipment (CPEs) or end-point devices 10A-C, such as personal computers or set top boxes with attached gaming devices, that subscriber's use to access the services available form a remotely located application or registration server 20. Each end-point device is connected to a corresponding access network 14 via a cable modem (CM) 12. Each access network 14, in turn, includes an access network termination point 16 such as a Cable Modem Termination System (CMTS), which functions as a gateway to the access network and which communicates with application server 20 over a wide area network (WAN) 18, such as the Internet. End-point devices 10A-C request admission to and participate in sessions with each other through the application server. A policy server 22, which manages admission control and Quality of Service on behalf of application server 20, communicates with application server 20 over the WAN. In general, policy server 22 decides, based on rules configured by the operator, the network state, and subscriber information, which sessions can be admitted into the network.

There are two basic communication channels that are particularly relevant in this system. One communication channel carries communications between application server 20 and policy server 22. The other communication channel carries communications between policy server 22 and the access network termination devices (e.g. the CMTSs for the cable world and BRAS for the DSL world). The interface between policy server 22 and application server 20 is XML, HTTP, or some other mutually agreed upon interface. This protocol would typically be a protocol that is proprietary to the entity that is providing the service. In contrast, the interface between application server 20 and the access network termination devices is typically defined by industry-adopted standards.

In the illustrated embodiment, each CPE is shown as being connected to a different access network and three separate CMTSs are involved. It should be understood, however, that this configuration is purely for illustration purposes only and is not meant to imply that other configurations are not possible. For example, the CPE's could all be on the same access network. Whether that is the case depends on where of the CPEs are geographically located. In addition, even though the CPEs might in fact be on different access networks as shown, it is possible that the three access networks connect to a different line card in the same CMTS.

The CMTS, which sits at a cable head-end of the corresponding access network, functions as a data switching system designed to route data to and from many cable modem users over a multiplexed network interface. It integrates upstream and downstream communications over the access networks (e.g. a cable data network) to which it is connected. In the described embodiment, the CMTS implements a protocol (e.g. the DOCSIS RFI MAC protocol) to connect to cable modems over the access network. DOCSIS refers to the set of Data-Over-Cable Service Interface Specifications, which defines how to transmit data over cable networks in a standard fashion (see DOCSIS 1.0, 1.1, and 2.0). RFI is the DOCSIS Radio Frequency Interface specification defining MAC and Physical Layer interfaces between CMTS and CM network elements.

Application server 20, which is typically managed by a content provider, is the entity that delivers the content to the applications running on CPEs 10A-C connected to cable modems 12A-C.

Cable modems 12A-C enable other Customer Premises Equipment (CPE) 10A-C to connect to access networks 14A-C and receive cable services. In the described embodiment, the cable modem is a 64/256 QAM (Quadrature Amplitude Modulation) RF receiver that is capable of delivering up to 30 to 40 Mbps of data in a 6 MHz cable channel. Data from the user is modulated using a QPSK/16 QAM transmitter with data rates from 320 kbps to 10 Mbps (where QPSK refers to Quadrature Phase Shift Keying modulation). The upstream and downstream data rates can be flexibly configured using cable modems to match subscriber needs.

Policy server 22 is a system that primarily acts as an intermediary between application server 20 and CMTS(s) 16A-C. It applies network policies to requests from the application servers and proxies messages between the application server and the CMTSs. In the described embodiment, it implements the functionality that is specified by the Packet Cable Multimedia (PCMM) standards (e.g. see PacketCable Multimedia Architecture Framework Technical Report PKT-TR-ARCH-V01-030627) as well as the extended functionality described herein. In its capacity as an intermediary, policy server 22 grants QoS for different requesters based on policy rules established by the operator of the network or service, and affects the QoS by pushing down policy decisions to the termination devices (e.g. the CMTSs). Its extended functionality includes keeping track of and monitoring the state of the network (what is happening on the network, the state of the sessions, etc.) and making policy decisions based on the state of the network.

The application server can provide any one of a number of different services including, for example, video conferencing and online multi-player video games to name two of the more popular services. For the purpose of the following description, it is assumed that the application server is a games server (e.g. a Microsoft Xbox or a Sony Server) which supports multiple user gaming applications.

In a multipoint environment in which several endpoints are trying to share a session together, often one endpoint will ultimately function as the host. The significance of being the host server is that all other servers interact with it. The host server determines what needs to happen at all participating locations and it receives communications from all participating game servers that want to interact with other game servers in that particular instance of the game. The host server also forwards communications to all other game servers that are affected. As a consequence, the host server needs to have greater bandwidth allocated to it as compared to the game servers of the other subscribers to enable it to handle the larger volume of communications for which it will be responsible. For example, the host server might typically need twice the bandwidth of the other game servers participating in the game. Often, however, it is not known at the time that the endpoints register with the application server nor can it be determined at the beginning of the session which end-point device will function as the host. The described embodiment provides a solution to this problem as follows.

Figure 2:
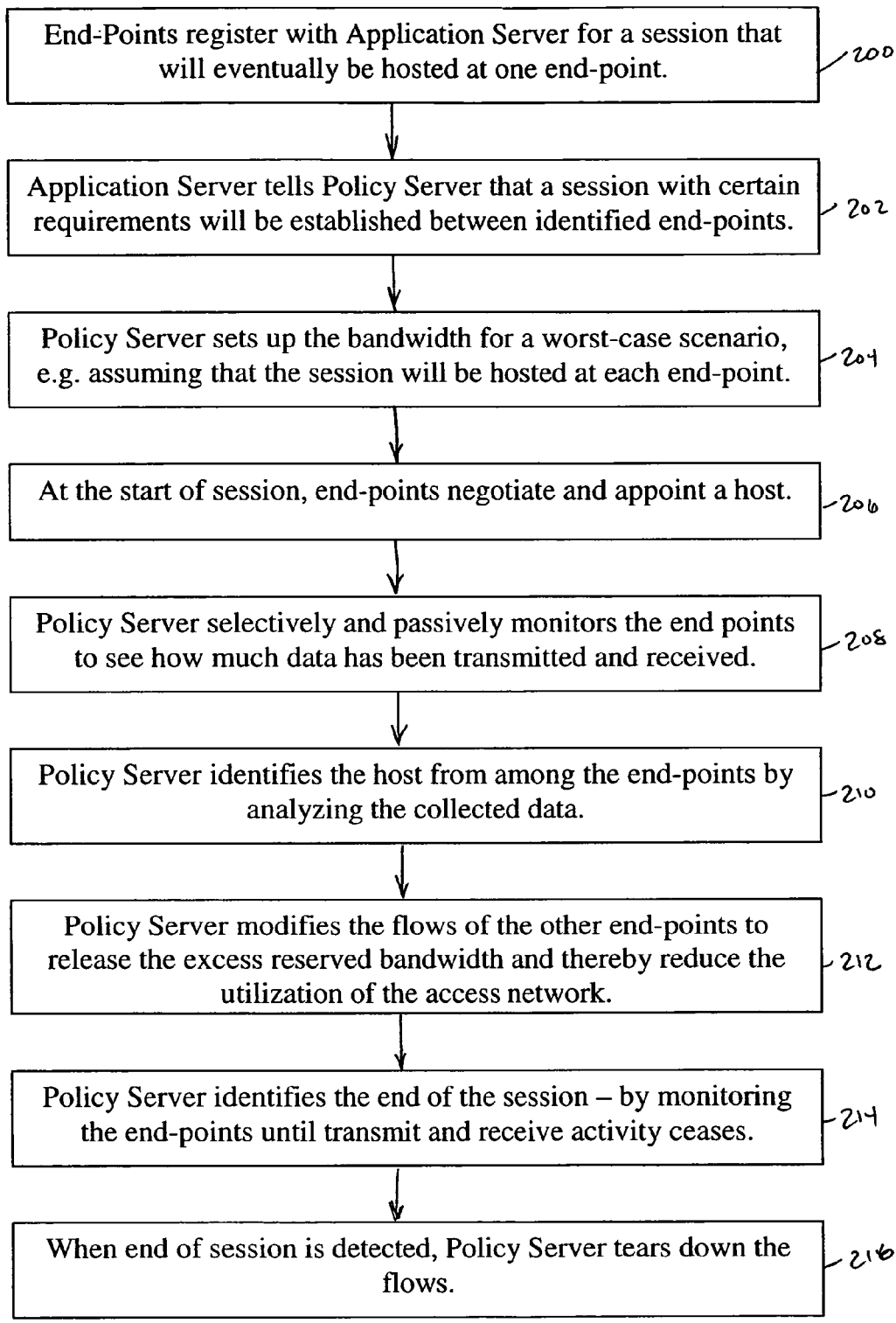
FIG. 2 is a flow chart of the process for adaptively modifying the policies regarding network traffic flows.

Referring to FIG. 2, each of the end-points A, B, and C registers with server application 20 for a session that will eventually be hosted at one end-point (step 200). The registration involves indicating that they want to play a particular game together. The details of the registration process vary depending upon the particular application that is involved.

After the end-points have registered, application server 20 notifies policy server 22 that a session with certain specified requirements will be established between the "identified" end-points, i.e., the registered entities (step 202). Since the application server has no knowledge of where the session will be hosted, the application server does not identify the host at this time.

Policy server 22 initially responds to the notification from application server 20 by setting up bandwidth for a "worst-case scenario" (step 204). That is, in this particular example, policy server 22 treats each end-point as though it will be the host and assigns resources accordingly. In this case, the key resource is bandwidth. So, at the beginning of the session excess bandwidth is reserved for the session. In the cable network, this is achieved by setting up gates (i.e., policies or controls) at the affected CMTSs for upstream and downstream directions.

As a rule, depending on the particular application server that is being used and the application that is being run through the shared session, either the policy server or the application server will know, a priori, the bandwidth needs of the host. However, if this knowledge is not initially known, it is empirically derived from observing what resources are used by the applications during actual sessions. Based on this knowledge, whether known ahead of time or determined empirically, policy server 22 assigns bandwidth to each subscriber that is sufficient for any one of them to play the role of host. So, regardless of which entity ultimately becomes the host, the initial bandwidth assignments provide sufficient resources. Application server 20 also takes care of requesting the other parameters that are necessary for the type of session being established (e.g. latency, etc).

At the start of session, the end-points negotiate and appoint a "host" (step 206). Negotiation is based on whatever parameters are relevant to the session that will be set up and will typically follow a protocol that is proprietary to the specific application that is being run.

After the session has begun and in preparation for reallocating resources, policy server 22 watches bandwidth utilization by each subscriber (step 208). That is, policy server 22 selectively and passively monitors the end points to see how much data is being transmitted and received per flow. These measurements are made at the subscriber level and the CM and/or CMTS level, whichever is applicable. It does this, for example, by polling the counters in the MIBs at the CMs. And/or it polls appropriate counters within the data structures maintained by the CMTSs. The monitoring is passive in that it does not interfere with the functioning of the CMTS.

After policy server 22 has obtained sufficient data, it analyzes that data to identify which of the end points is functioning as the host (step 210). In other words, it identifies the end-point session that is handling the most traffic.

After identifying the host server, policy server 22 revises the policies that apply to this set of subscribers (step 212). For example, policy server 22 compares actual usage with authorized usage and it instructs the affected devices to modify the flows. In the world of cable networks that means going to the termination device, i.e., the CMTS; whereas, in the world of DSL world that means going to both the affected network access termination devices and the DSL modems. Since the goal of policy server 22 is to establish more efficient use of resources (e.g. bandwidth), it modifies the bandwidths that are reserved for the other flows so as to release the excess reserved bandwidth thereby freeing it up for use by others. The amount of bandwidth that is reserved for the various flows is dependent on policy considerations that are being implemented by the policy server or the entity that manages the policy server. Since the initial reservations were based upon the needs to the host severs, this might mean that initial reservations for the host server are left undisturbed while the reservations for the other servers are reduced. Alternatively, it might also be appropriate to modify the reservation for the host server as well (either upward or downward) if monitored traffic flows warrant such an adjustment.

After the bandwidth reservations have been modified based upon knowing which server is functioning as the host, policy server 22 continues to monitor the activity of the end-points (e.g. usage of the flows that have been set up). It does this until it detects that the transmit and receive activity has ceased for a sufficiently long time, indicating that the session has ended (step 214). The inactivity period is configurable by the operator and will typically depend on the actual application. Gaming, for example, tends to be very interactive and so a short period of inactivity would typically be a sufficient indication that the game is over and the flows can be to torn down.

Upon detecting that the session has ended, policy server 22 tears down the flows (step 216). During the tear down, policy server 22 instructs the CMTS (or other edge devices such as the B-RAS or PDSN/GGSN) to release resources making them available to other sessions.

In the embodiment just described, the policy server directly monitors the activity of the different subscribers. Alternatively, this information can be retrieved from another device in the network that may be monitoring the traffic and the bandwidth utilization associated with the subscriber and his/her sessions, in which case the policy server would not perform direct monitoring. Still another mechanism by which the policy server can learn of the information required to dynamically adjust reserved network resources is by having the devices through which the media is flowing (e.g. CMTS, routers, monitoring devices, or sniffers) notify the policy server of when certain amounts of traffic (volume) associated with the specific subscribers' sessions have passed through the device (i.e., thresholds for volume of data traversing the device has been hit). The policy server can identify which subscriber is consuming the most amount of bandwidth based on which session is the first to trigger such a volume usage consumption notification from the device(s) in the media path.

The above-described approaches are applicable to any network session in which one of the subscribers functions as the host and it is not known at the beginning of the session who that subscriber will be. Note, however, that the methods just described can also be applied to intelligently adjust the rate for a single point session. After a session is first set up with an approximate reservation of bandwidth, the policy server dynamically adjusts the bandwidth reserved for the session by interpreting the counters retrieved from the end-point or intermediate devices. If the counters collected from the end point and intermediate equipment indicate that data has been dropped, then the policy server knows that the reservation should be increased to ensure throughput. Alternatively, if the policy server sees that the average rate, calculated using the same counters, is below the rate that was originally reserved for the session, the policy server can dynamically decrease the reservation for the session so that excess bandwidth or resources can be reclaimed for use by other entities.

The principles described herein are not limited to cable networks but they are generally applicable to any network in which QoS is provided to the devices including, for example, DSL (Digital Subscriber Loop), FTTx (Fiber To The X), xPON (Passive Optical Network), and a data-over-wireless (e.g. a 3G wireless network). In the case of DSL networks, different devices that transport the media (called policy enforcement points) are involved but they serve similar functions to the CMTSs and CMs of the cable networks. For example, in the DSL world the policy enforcement points includes Digital Subscriber Line Access Multiplexers (DSLAMs), Asynchronous Transfer Mode (ATM) switches, Broadband Remote Access Servers (BRAS) and IP routers. Similarly, in the 3G wireless world, the PEP can be Packet Data Serving Node (PDSN), Gateway GPRS Support Node (GGSN).

Other embodiments are within the following claims.

What is claimed is:

1. A method for managing a session over a network, wherein the session involves multiple end points obtaining services via an application server, said method comprising:

after the end points have registered with the application server for said session and before knowing which of the endpoints functions as a host server for said session, establishing initial policies for network traffic flows for each end point participating in said session;

after establishing the initial policies, determining network traffic volumes for the network traffic flows for at least some of said multiple end points participating in said session;

from the network traffic volumes determined for the network traffic flows, identifying which of said multiple end points is functioning as the host server for said session; and after identifying which of said multiple end points is functioning as the host server, establishing new policies for network traffic flows for said multiple end points, wherein under the new policies fewer network resources are reserved for each of the multiple end points other than and as compared to the end point functioning as the host server.

2. The method of claim 1, wherein determining network traffic volumes for the network traffic flows for at least some of said multiple end points participating in said session involves determining network traffic volumes for the network traffic flows for each of the multiple end points participating in said session.

3. The method of claim 2, wherein determining network traffic volumes for the network traffic flows involves monitoring the network traffic flows.

4. The method of claim 2, wherein determining network traffic volumes for the network traffic flows involves receiving notifications from one or more other entities on the network about the network traffic flows.

5. The method of claim 2, wherein the initial policies specify the amount of network bandwidth reserved for each end point.

6. The method of claim 5, wherein under the initial policies the same amount of network bandwidth is reserved for each of said multiple end points.

7. The method of claim 6, wherein the network bandwidth that is reserved for each end point exceeds an expected bandwidth required for the host server.

8. The method of claim 7, wherein establishing new policies for network traffic flows for said multiple end points involves reducing the amount of bandwidth that is reserved for each of the multiple end points other than the end point functioning as the host server.

9. The method of claim 2, wherein the network is a cable network.

10. The method of claim 2, wherein the network is a Digital Subscriber Loop (DSL) network.

11. The method of claim 2, wherein the network is an Fiber to the X (FTTx) network.

12. The method of claim 2, wherein the network is an Passive Optical Network (xPON) network.

13. The method of claim 2, wherein the network is a data-over-wireless network.

14. The method of claim 1, wherein determining network traffic volumes for the network traffic flows for at least some of said multiple end points participating in said session involves monitoring the network traffic volumes for the network traffic flows for at least some of said multiple end points participating in said session.

15. The method of claim 14, wherein establishing initial policies, monitoring the netwok traffic volumes, and establishing new policies are implemented by a policy server that is remote from the application server and wherein monitoring involves passively monitoring said at least some of said multiple endpoints.

16. The method of claim 14, wherein monitoring involves passively monitoring devices associated with said at least some of said multiple endpoints.

17. The method of claim 16, wherein the network includes cable modems and wherein passively monitoring involves polling Management Information Bases (MIBs) at cable modems associated with said at least some of said multiple endpoints.

18. The method of claim 16, wherein the network includes cable modem termination systems (CMTSs) and wherein passively monitoring involves polling MIBs at CMTSs associated with said at least some of said multiple endpoints.

* * * * *